UNITED STATES PATENT OFFICE.

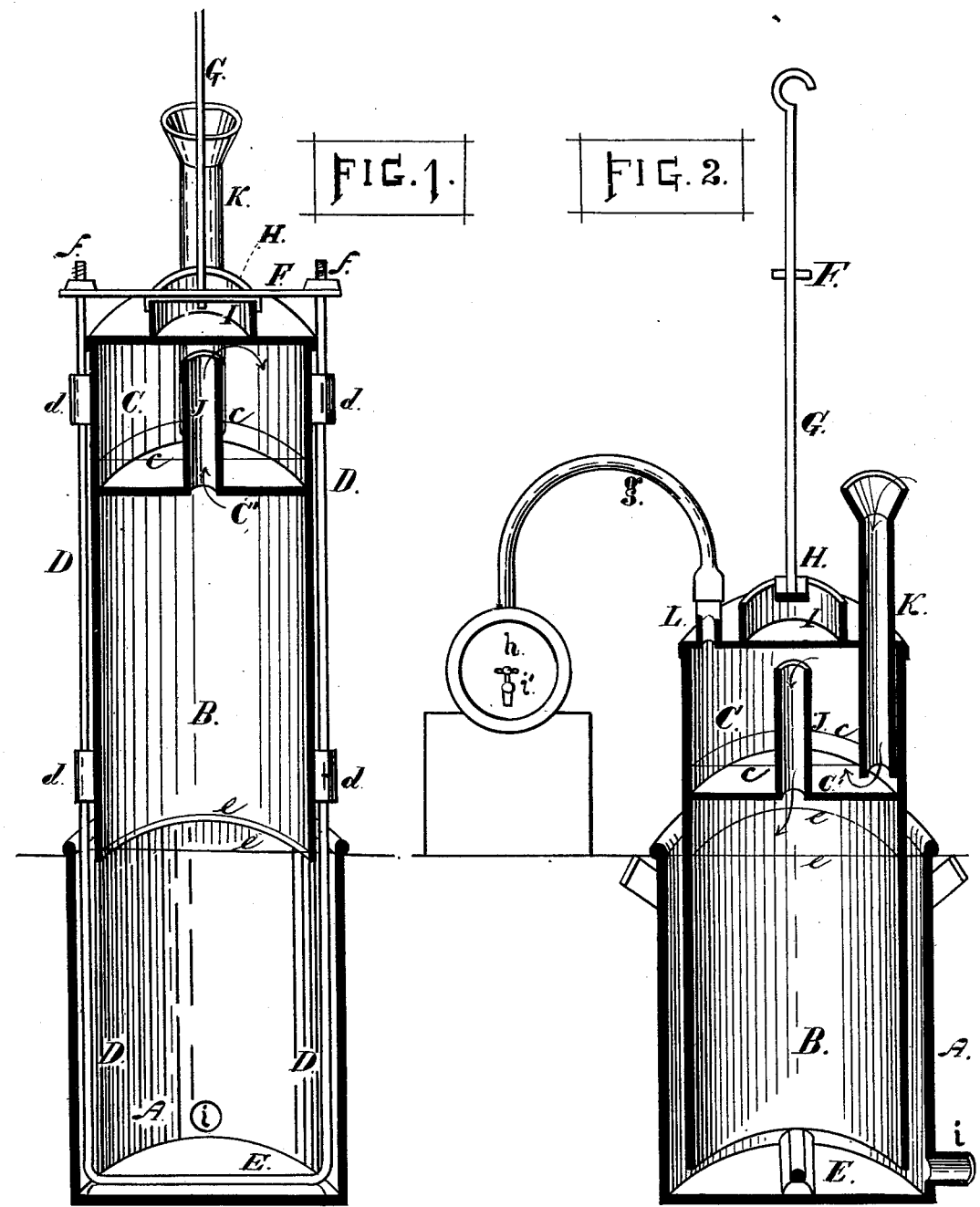
J. WOLF.
Preserving and Drawing Fluids.
No. 222,339. Patented Dec. 2, 1879.

JOHN WOLF, OF FORT ATKINSON, WISCONSIN.

IMPROVEMENT IN PRESERVING AND DRAWING FLUIDS.

Specification forming part of Letters Patent No. 222,339, dated December 2, 1879; application filed October 25, 1879.

*To all whom it may concern:*

Be it known that I, JOHN WOLF, of the city of Fort Atkinson, State of Wisconsin, have invented an Improved Method of Preserving Fluids and Drawing Fluids from a Barrel, of which the following is a specification.

The object of my invention is to prevent the escape of gas through the vent of a vessel while drawing from it gaseous or fermented liquids, and also to provide an automatic air-supply to take the place of the liquids drawn off, the manner and purpose of which I now proceed to describe in detail.

Similar letters of reference indicate like parts in each figure.

Figure 1 is a vertical section of my automatic fluid-vent and air-supply, which is of a cylindrical form, with the front half removed to expose the inner parts, all in position as when charged, ready for use. Fig. 2 is also a vertical section of the same, cut at a right angle from that of Fig. 1, in position as when not charged for use, and showing its connection with barrel $h$ by means of hose $g$.

A is a cylindrical reservoir for water, provided with rods D, which are secured to the bottom E, and are connected at the top by cross-bar F and nuts $ff$.

B is a hollow cylinder, open at the bottom, and provided with guides $d$, in which is placed the guide-rods D. C is a chamber at the top of cylinder B, formed by partition C', in the center of which is placed tube J, which extends nearly to the top of chamber C.

Tube K is inserted through and secured to the top near one side of chamber C, extending nearly to the bottom of the chamber. Also, thimble L is secured to the top near the opposite side of chamber C, for the purpose of connecting the chamber with barrel $h$ by means of hose $g$.

Upon the top of cylinder B is box I, for the purpose of placing within it a weight, of which I shall speak hereinafter.

H is a cross-bar secured to the top of box I, to which is fastened rod G, which passes up through the guide-hole in cross-bar F.

$c$ and $e$ are water-lines, which I shall explain hereinafter. $i$ is a passage for drawing the water from reservoir A. $i'$ is the faucet in barrel $h$.

It will be observed that reservoir A is stationary and the cylinder B movable up and down upon the guide-rods D, Fig. 1 being the highest and Fig. 2 the lowest point of movement.

The reservoir A is filled with water to the line $e$ in Fig. 1, which submerges the lower edge or end of cylinder B, closing it air-tight. Chamber C is also filled to the line $c$ with water by pouring it into funnel-tube K, which submerges the lower end of tube K, and is thereby sealed air-tight, as in Fig. 2, having no escape except through hose $g$ into barrel $h$. The water in chamber C is only exhausted by evaporation, and should always be kept in quantity sufficient to act as a valve to air-chamber B, the two chambers being connected by tube J, Figs. 1 and 2. In Fig. 2 reservoir A and air-chamber B are both filled with water to the line $e$, while the lower edge of cylinder B rests upon the horizontal portion of rod D at the bottom of reservoir A. Fig. 2 is ready for being charged for use. The water in reservoir A fills the chamber B to line $e$. Chamber C is also filled with water to line $c$. Hose $g$ is secured to thimble L and to barrel $h$. The barrel is filled with liquid and all air-tight. A weight is now placed in box I, and all is ready for being raised to the position as in Fig. 1, which is done by means of rod G.

The two air-chambers C and B are united by tube J, so as to operate as one.

While raising cylinder B, Fig. 2, a vacuum is produced, which is supplied with air through tubes K and J, as indicated by arrows. The water being forced from tube K by atmospheric pressure, the air follows and bubbles up through the water into chamber C until cylinder B is allowed to rest, when it is buoyed up by the air in the chamber, which produces a reaction upon the water in chamber C, forcing it back into tube K, closing it completely.

The passage from chamber C to barrel $h$ is always open through hose $g$, the hose adjusting itself during the operation of cylinder B.

The atmospheric pressure upon the barrel is governed wholly by the amount of weight placed in box I. Shot may be used for weight.

The air-chamber may be charged at any time by raising rod G.

The reservoir may be placed beneath the room occupied by the barrel, the hose and rod G passing above for convenience of operation.

It will be observed, also, that this device automatically prevents the escape of gas or evaporation at any time, excludes all odors from without, and presses the liquid from the barrel while being drawn.

Having fully described the construction, purpose, and operation of my invention, what I claim, and desire to secure by Letters Patent, is—

1. In liquid-preservers, the reservoir A, air-chamber B, tube J, chamber C, and hose $g$, constructed and operating together substantially as described, for the purpose set forth.

2. Reservoir A, with guide-rods D, in combination with cylinder B and lift-rod G, as described, for the purpose specified.

3. The combination of a liquid-valve, C, J, and K, substantially as described, with air-chamber B, as described, for the purpose set forth.

JOHN WOLF.

Witnesses:
  GEO. C. SMITH,
  THOMAS CRANE.